United States Patent [19]

Maher et al.

[11] Patent Number: 5,233,605
[45] Date of Patent: Aug. 3, 1993

[54] METHOD FOR ASSURING FIDELITY OF A SUMMING PROCESS

[75] Inventors: John W. Maher, Woodstock; James H. Errico, Chicago, both of Ill.

[73] Assignee: Motorola, Inc., Schaumburg, Ill.

[21] Appl. No.: 770,398

[22] Filed: Oct. 3, 1991

[51] Int. Cl.[5] ...................... H04L 12/18; H04Q 11/04
[52] U.S. Cl. ......................................... 370/62; 370/77
[58] Field of Search .................. 370/62, 77; 379/202, 379/203, 204, 205, 206

[56] References Cited

U.S. PATENT DOCUMENTS

| | | | |
|---|---|---|---|
| 3,924,082 | 12/1975 | Oliver et al. | 370/62 |
| 4,658,398 | 4/1987 | Hsing | 370/62 |
| 4,797,876 | 1/1989 | Ratcliff | 370/62 |
| 5,054,021 | 10/1991 | Epps | 370/62 |

*Primary Examiner*—Douglas W. Olms
*Assistant Examiner*—H. Kizou

*Attorney, Agent, or Firm*—Timothy W. Markison; Steven G. Parmelee

[57] ABSTRACT

In a digital summing process that sums non-linear digital signals by converting them to linear signals, computing their two's complement, summing the two's complements together and converting the resultant into a non-linear resultant, the fidelity of the summing process may be verified in the following manner. When only one non-linear digital signal is being summed, an algorithm determines whether the one non-linear digital signal being summed is equivalent to a predetermined value which, when passed through the summing process, will yield a different value than the one inputted. If the algorithm determines that the one non-linear digital signal is equivalent to a predetermined value, it sets a flag which indicates that the resultant over written with the predetermined value. Once the resultant is overwritten with the predetermined value, the flag is reset.

6 Claims, 2 Drawing Sheets

FIG.1

| ADDRESS | I/C | FC 1 | FC 2 | VOL. 2 | VOL. 1 | VOL. 0 | BUS No. | SLOT No. |
|---|---|---|---|---|---|---|---|---|
| 000 000 000 000 | 0 | 0 | 0 | X | X | X | 00000 | 00111 |
| 000 000 000 001 | 0 | 0 | 0 | 1 | 1 | 0 | 00000 | 00111 |
| 000 000 000 010 | 0 | 0 | 0 | 1 | 0 | 1 | 00111 | 00010 |
| 000 000 000 011 | 0 | 0 | 0 | 1 | 0 | 0 | 11101 | 11111 |
| 000 000 000 100 | 1 | 0 | 0 | 0 | 0 | 0 | 00001 | 11011 |
| 000 000 000 101 | 0 | 0 | 0 | 1 | 1 | 1 | 11111 | 11111 |
| 000 000 000 110 | 1 | 0 | 0 | 1 | 1 | 1 | 11111 | 01111 |
| 000 000 000 111 | 1 | 1 | 1 | X | X | X | 00000 | 11111 |
| 000 000 001 000 | 1 | 1 | 0 | X | X | X | 00100 | 11111 |

FRAME HEADER 109

DESTINATION DATABASE

FIG.2

| BUS No. | SLOT No. | |
|---|---|---|
| ADDRESS | | PCM CODE |
| 00000 | 00000 | PCM CODE FOR SLOT 0 OF AEB BUS 0 |
| 00000 | 00001 | PCM CODE FOR SLOT 1 OF AEB BUS 0 |
| 00000 | 00010 | PCM CODE FOR SLOT 2 OF AEB BUS 0 |
| 10111 | 00000 | PCM CODE FOR SLOT 0 OF AEB BUS 23 |
| 10111 | 00001 | PCM CODE FOR SLOT 1 OF AEB BUS 23 |

SIGNAL DATABASE 5,233,605

METHOD FOR ASSURING FIDELITY OF A SUMMING PROCESS

FIELD OF THE INVENTION

This invention relates generally to communication system networks and in particular to a method that assures fidelity of a particular digital signal when it passes through a summing process of the communication system network without being summed to another digital signal.

BACKGROUND OF THE INVENTION

Copending patent application entitled A Communication System Network, filing date Apr. 16, 1990, Ser. No. 07/509,915 discloses a communication system network. The communication system network comprises a plurality of communication systems operably coupled to a processing multiplexer. The processing multiplexer comprises a plurality of communication system interface modules which comprise receiving means, transmitting means, destination data base circuitry, addressing circuitry, processing circuitry and signal data base circuitry. The signal data base circuitry comprises a dual port data base which stores digital signals produced by the plurality of communication systems every frame cycle. In addition, the signal data base circuitry routes stored signals to the processing circuit during the same frame cycle. The processing circuit, based on system configuration data, stored in the destination data base, indicates to the processing circuit which signals stored in the signal data base are to be processed. One of the processes performed by the processing circuit is summing together some of the audio signals to be routed to a final destination. For a complete discussion of signal processing by the processing circuit refer to the above sited co-pending patent application.

The signals stored in the signal data base are typically digital representations of audio signals. Per Mu law technology, these digitized audio signals are non-linear which presents a problem when audio signals are to be summed together. To overcome this problem, the non-linear Mu law digitized audio signals are converted into linear signals by the processing circuit. Once the processing circuit has linearized the signals, it takes their two's complement and sums them together. Once a resulting sum is achieved, it is converted back into a non-linear Mu law digital signal. This non-linear Mu law digital signal is then routed to its final destination which could be any repeater, base station, and/or speaker of a console in any of the plurality of communication systems.

A problem arises with the above described summing process when one of the digital signals is 7F (hexadecimal). When 7F is passed through the processing circuit, it is converted to 80 (hexadecimal). In Mu law 7F represents minus 0 while 80 represents full scale which will distort the resulting summation. One known solution for summing digitized audio signals is to convert 7F to FF (hexadecimal) which represents plus 0 in Mu law. By performing this conversion before the non-linear signals are converted in to linear signals, the resulting summation will be accurate. However, from time to time, the signal data base may store digital data. If the digital data is 7F, it will be distored either by the summing process or the conversion to FF. Therefore, a need exists for a method which improves the fidelity of the summing process for predetermined digital signals.

SUMMARY OF THE INVENTION

These needs and others can be substantially met by the method for assuring fidelity of a summing process disclosed herein. In a digital summing process that sums non-linear digital signals by converting them to linear digital signals, computing their two's complement, summing the two's complements together, and converting the resulting summation back into a non-linear signal, a method for assuring the fidelity of the summing process may be obtained as follows. Once it is determined that only one non-linear digital signal is being summed, an algorithm determines whether the one non-linear digital signal is equivalent to a predetermined value. If the non-linear digital signal is equivalent to the predetermined value, a flag is set. The summation process proceeds as normal for the one non-linear digital signal, however, due to the flag being set, the resultant of the summing circuit is overwritten with the predetermined value.

BRIEF DESCRIPTION OF THE DRAWINGS

FIG. 1 illustrates one possible configuration of the destination data base.

FIG. 2 illustrates one possible configuration of the signal data base and the digitized signal information stored in it.

DESCRIPTION OF THE PREFERRED EMBODIMENT

Figure 3:
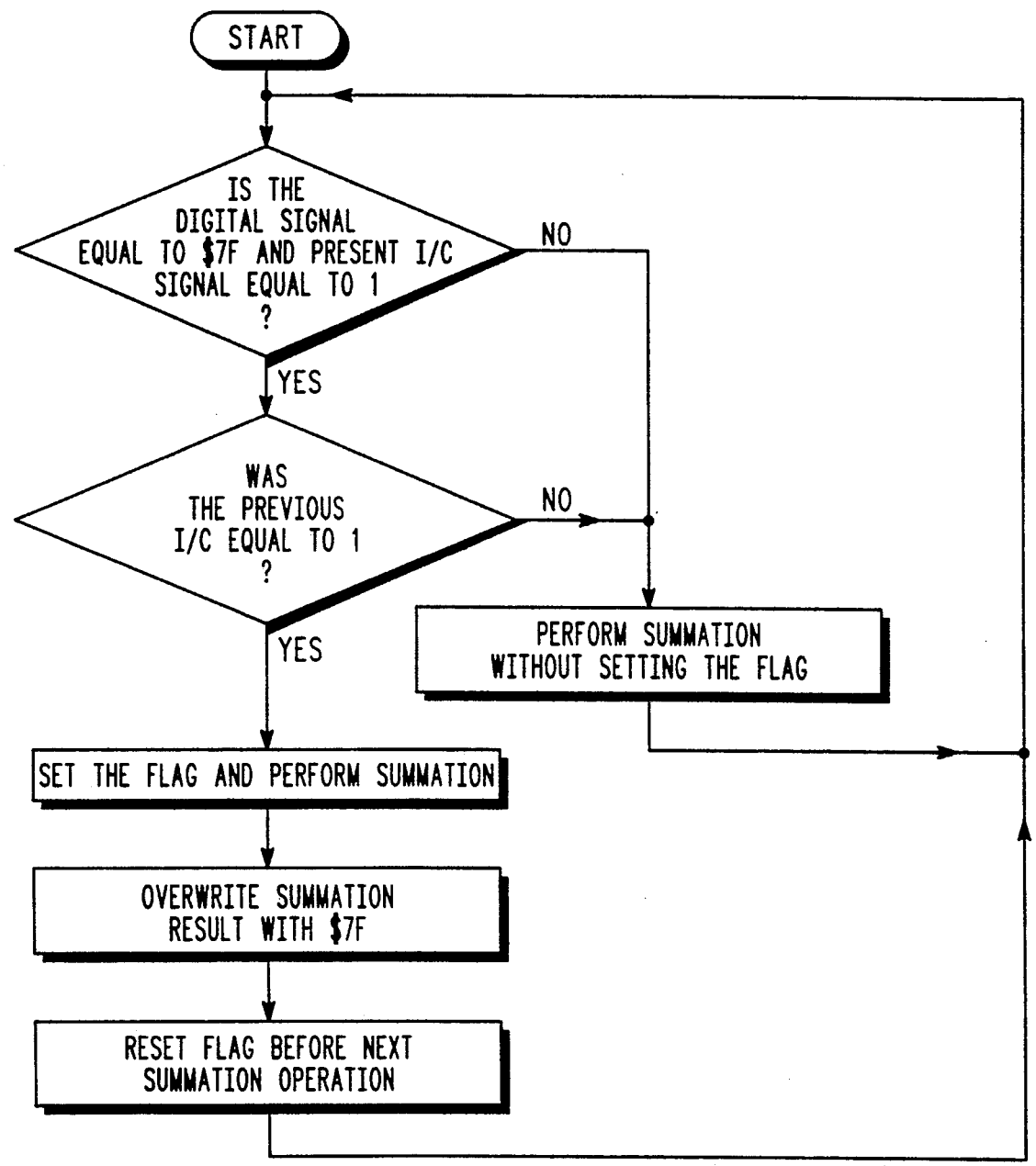
FIG. 3 illustrates a logical diagram of a method to assure the fidelity of a summing process in accordance with the present invention.

Generally, the present invention provides for a method for assuring the accuracy, or fidelity, of a summing process when it is summing particular digital signals. When only one digital signal is being summed, it is still converted into a linear signal, its two's complement is computed, and it is converted back into a non-linear digital signal. If the non-linear signal has a predetermined value such that when it passes through the summing process, its resultant is different than the value inputted, a flag will be set. With the flag set, the resultant of the summing circuit is overwritten by the predetermined value. At the conclusion of this particular summation, the flag is reset and the summing process is ready to perform its next summing operation.

FIG. 1 illustrates a configuration of the destination data base. The destination data base comprises an address field 100, an input control (I/C) field 101, a first and second functional control section 102 and 103, three volume level inputs 104, 105 and 106, a bus number field 107 and a slot number field 108. The bus number field 107 and the slot number 108 indicate an address of a non-linear digital signal stored the in signal data base that is to be at least part of a summation. The remaining data in the row relates to how the signal is to be summed, or indicates data is being passed. For a complete discussion of the destination data base, the signal data base, and the processing circuit including the summing process refer to copending patent application entitled A Communication System Network, filing date of Apr. 16, 1990, Ser. No. 07/509,915. However, for purposes of understanding the present invention some of the summing process will need to be described herein, but it should be noted that the present discussion is not complete.

The summing process begins with the processing circuit reading the I/C column 101. (Note that the first entry in the destination data base is reserved for frame header 109 which is used, in part, for synchronization.) If the processing circuit reads a 0 in the I/C column 101, the addressed non-linear digital signal is to be part of a summation. The addressed signal is converted in to a linear signal prior to be summed as described in the background section. The volume fields 104, 105, and 106 indicate at which volume level this signal is to be summed at. If the next entry in the I/C column 101 is also a 0, the summing process sums the previously addressed signal with the signal presently addressed. This summing of addressed signals continues until the processing circuit reads a 1 in the I/C column 101. When the 1 is read, the presently addressed signal is summed to the previously summed addressed signals and the resulting summation is outputted. As mentioned above, the resulting summation is converted back into a non-linear signal and routed to its final destination somewhere within the communication system network.

FIG. 2 illustrates one possible configuration of the signal data base and the digitized signal information stored in it. The signal data base comprises an address field 201 and a PCM code field 202. The entries in the signal data base are based on the location of the source producing the signal. For example, entries 203-205 are signals produce by a source coupled to slot 0, 1, and 2 of AEB bus 0, respectively. Similarly, entries 206 and 207 are signals produced by a source coupled to slots 0 and 1 of AEB bus 23, respectively. For a complete discussion of the signal data base refered to co-pending patent application entitled A Communication System Network, filing date of Apr. 16, 1990, Ser. No. 07/509,915.

As mentioned in the background section, a problem may arise if the digitized non-linear signal stored in the signal data base is one that has a predetermined value which when passed through the summing process yields a different output value than was inputted. This problem is particularly concerning when the digitized non-linear signal is data which will not be summed to another signal. For example, if the predetermined valued 7F (hexadecimal), the resulting output will be 80 (hexadecimal) or FF (hexadecimal) if the processing circuit employs the conversion algorithm discussed in the background section. In order to prevent this the processing circuit may include an algorithm as illustrated in FIG. 3.

FIG. 3 illustrates a logical diagram which assures the fidelity of the summing process when it is only summing one signal and that digital signal has a predetermined value. At step 301, the process determines whether the digital signal equals hexadecimal digit 7F and the present I/C signal is equal to 1. If either of these conditions are not met, the process proceeds to step 302 wherein the summing process performs its normal summation without setting a flag. Once this is done the process repeats at step 301. If the conditions of step 301 are met, the algorithm determines whether the previous I/C signal in the destination data base is equal to 1 303. If the previous I/C entry was not equal to 1 303, the process proceeds to step 302 as described above. If the previous signal I/C was equal to 1, the algorithm sets a flag and allows the summation to be performed as previously described 304. Once the summation is complete, the resultant is overwritten with the hexadecimal digit 7F 305. Once the output resultant is overwritten with hexadecimal digit 7F, the process proceeds to step 306 wherein the flag is reset before the next entry in the destination data base is read. The above process repeats for each entry in the destination data base.

If the previous entry in the destination data base is not 1, but the present signal is 7F, the algorithm of substituting FF for 7F is used. This condition will only occur when digitized audio signals are being summed, whereas the above mentioned condition may occur for digitized audio signals when only one is to be summed or when data is being passed through the processing circuit.

We claim:

1. In a digital signal summing process that sums non-linear digital signals by converting the non-linear digital signals into linear digital signals, computing two's complement of each of the converted linear digital signals, summing the two's complement of the linear digital signals to produce a resulting linear summation, and converting the resulting linear summation into a resulting non-linear digital signal, a method for assuring fidelity of the summing process when only one non-linear digital signal is being summed, the method comprises the steps of:
   a) detecting that only one non-linear digital signal is to be summed;
   b) determining whether the one non-linear digital signal is equivalent to a predetermined value;
   c) setting a flag when the one non-linear digital signal is equivalent to the predetermined value;
   d) performing the linear conversion, the two's complement, the summation, and the conversion back to a non-linear signal of the one non-linear digital signal; and
   e) overwritting the resulting non-linear summation with the predetermined value when the flag is set.

2. In the method of claim 1, step (b) further comprises determining whether the one non-linear digital signal is equivalent to the predetermined value, wherein the predetermined value is a value that, when individually summed by the summing circuit, yields a different resultant value from that inputted.

3. The method of claim 1 further comprises resetting the flag when the resulting non-linear summation has been overwritten with the predetermined value.

4. In a digital signal summing process that sums non-linear Mu-law digital signals by converting the non-linear Mu-law digital signals into linear digital signals, computing two's complement of each of the converted linear digital signals, summing the two's complement of the linear digital signals to produce a resulting linear summation, and converting the resulting linear summation into a resulting non-linear Mu-law digital signal, a method for assuring fidelity of the summing circuit when only one non-linear digital signal is being summed, the method comprises the steps of:
   a) detecting that only one non-linear Mu-law digital signal is to be summed;
   b) determining whether the one non-linear Mu-law digital signal is equivalent to a digital representation of minus zero;
   c) setting a flag when the one non-linear Mu-law digital signal is equivalent to the digital representation of minus zero;
   d) performing the linear conversion, the two's complement, the summation, and the conversion back to a non-linear signal of the one non-linear Mu-law digital signal; and e) overwritting the resulting non-linear summation with the digital representation of minus zero when the flag is set.

5. The method of claim 4 further comprises resetting the flag when the resulting non-linear summation has been overwritten with the digital representation of minus zero.

6. In the method of claim 4, step (b) further comprises determining whether the one non-linear Mu-law digital signal is equivalent to the digital representation of minus zero, wherein the digital representation of minus zero is hexadecimal digit 7F.

* * * * *